(12) United States Patent
Kashima et al.

(10) Patent No.: US 8,548,249 B2
(45) Date of Patent: Oct. 1, 2013

(54) INFORMATION PROCESSING APPARATUS, INFORMATION PROCESSING METHOD, AND PROGRAM

(75) Inventors: Koji Kashima, Kanagawa (JP); Tatsumi Sakaguchi, Kanagawa (JP); Masashi Eshima, Tokyo (JP)

(73) Assignee: Sony Corporation (JP)

( * ) Notice: Subject to any disclaimer, the term of this patent is extended or adjusted under 35 U.S.C. 154(b) by 160 days.

(21) Appl. No.: 12/931,778

(22) Filed: Feb. 10, 2011

(65) Prior Publication Data

US 2011/0243453 A1 Oct. 6, 2011

(30) Foreign Application Priority Data

Feb. 19, 2010 (JP) ............................... P2010-034915

(51) Int. Cl.
*G06K 9/46* (2006.01)
*G06K 9/66* (2006.01)

(52) U.S. Cl.
USPC ........... 382/192; 382/195; 382/217; 382/306; 704/260

(58) Field of Classification Search
USPC ......... 382/190, 192, 195, 217, 306; 702/260; 704/260
See application file for complete search history.

(56) References Cited

U.S. PATENT DOCUMENTS

| | | | |
|---|---|---|---|
| 7,035,467 B2 * | 4/2006 | Nicponski | 382/224 |
| 8,238,667 B2 * | 8/2012 | Hosaka et al. | 382/217 |
| 2003/0176860 A1 * | 9/2003 | Shimura | 606/53 |
| 2006/0025998 A1 * | 2/2006 | Sakai et al. | 704/260 |
| 2007/0162857 A1 * | 7/2007 | Weber et al. | 715/731 |
| 2008/0181505 A1 * | 7/2008 | Wu et al. | 382/190 |
| 2008/0216942 A1 * | 9/2008 | Hiraoka et al. | 156/145 |
| 2009/0041357 A1 * | 2/2009 | Yonezawa et al. | 382/195 |
| 2009/0052734 A1 * | 2/2009 | Hosaka et al. | 382/100 |
| 2009/0116752 A1 * | 5/2009 | Isomura et al. | 382/217 |
| 2009/0142030 A1 * | 6/2009 | Lee et al. | 386/52 |
| 2011/0243453 A1 * | 10/2011 | Kashima et al. | 382/195 |

FOREIGN PATENT DOCUMENTS

JP 2005-025715 A 1/2005

OTHER PUBLICATIONS http://www.sony.jp/taiken/xsb_online/details.html, searched Feb. 3, 2010.

\* cited by examiner

*Primary Examiner* — Gregory M Desire
(74) *Attorney, Agent, or Firm* — Lerner, David, Littenberg, Krumholz & Mentlik, LLP

(57) ABSTRACT

There is provided an information processing apparatus including an analysis section which analyzes, based on image information extracted from image data, a theme per image data group including a plurality of pieces of the image data, and a selection section which selects a combination of predetermined processing which is stored in association with the theme and the image data group based on the theme.

12 Claims, 15 Drawing Sheets

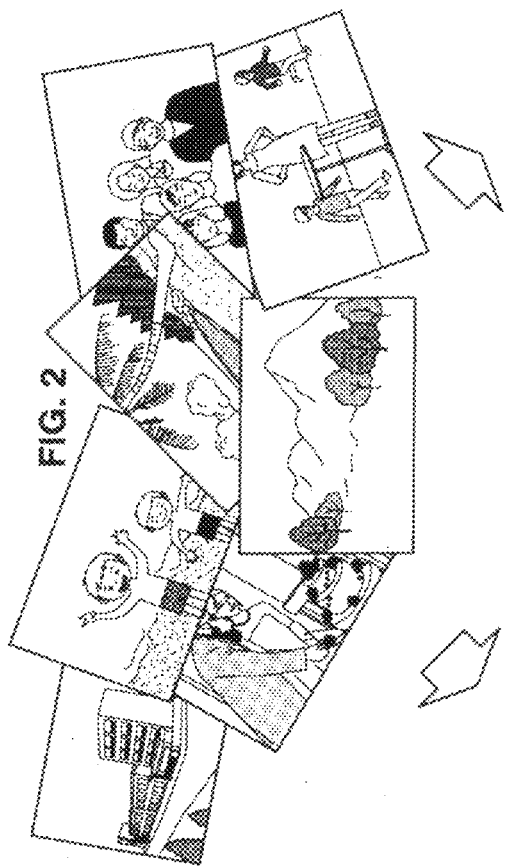
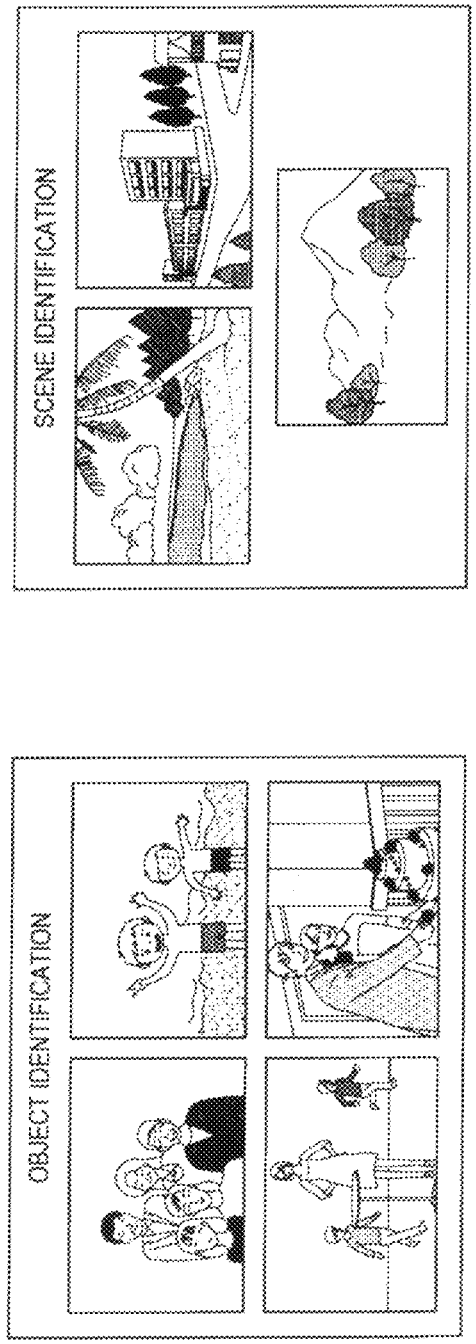
FIG. 2

FIG. 7
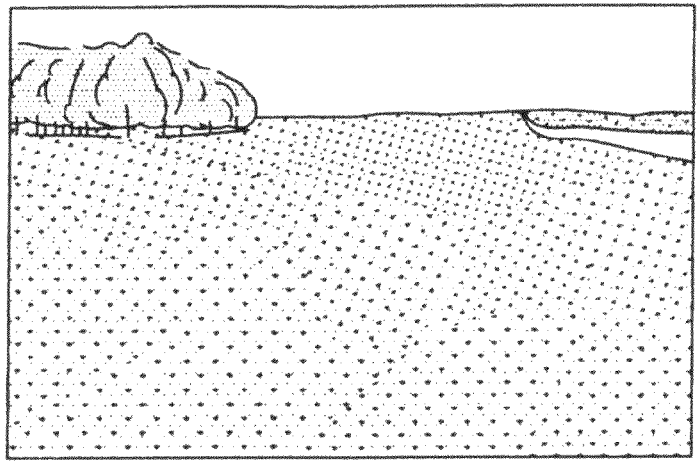  Field
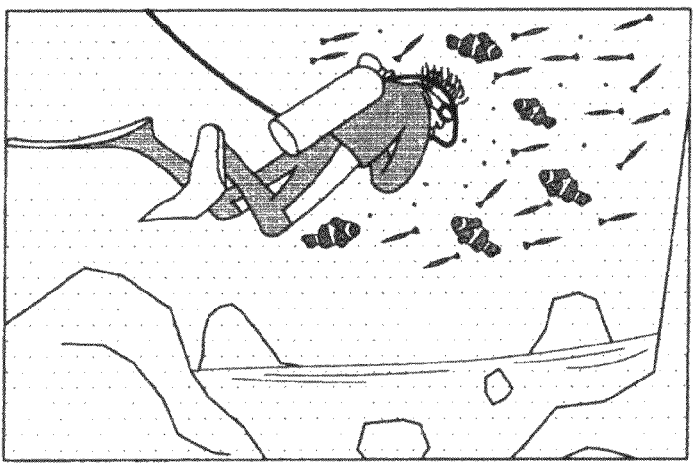  Underwater
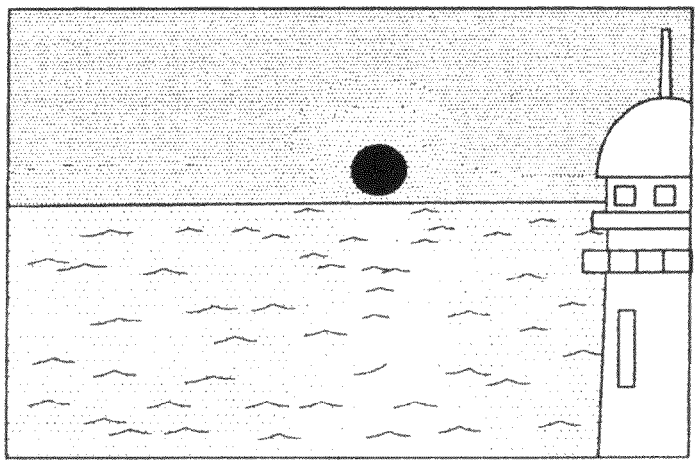  Sunset

FIG. 10

| LARGE CATEGORY | MIDDLE CATEGORY | SMALL CATEGORY | SPECIFIC EXAMPLE | DYNAMIC/STATIC | COOL/CUTE | EMOTIONAL/RATIONAL |
|---|---|---|---|---|---|---|
| FACT | NUMBER OF IMAGES | MANY | 50 OR MORE | +0.5 | | |
| | | FEW | 30 OR LESS | -0.5 | | |
| | SUBJECT TYPE | HUMAN | RATIO OF HUMAN IS LARGEST | | | +0.5 |
| | | ITEM | RATIO OF ITEM IS LARGEST | | | -0.5 |
| | | SCENE | RATIO OF SCENE IS LARGEST | -0.25 | +0.25 | -0.5 |
| HUMAN | SMILE | MANY | 50% OR LESS | | | +0.5 |
| | | FEW | 10% OR LESS | | | -0.5 |
| | KIDS | MANY | 50% OR LESS | +0.25 | -0.5 | |
| | | FEW | 10% OR LESS | -0.25 | +0.5 | |
| | COUPLE | MANY | 25% OR LESS | | | +0.5 |
| | ACTIVE POSTURE | MANY | 10% OR LESS | +0.5 | | |
| | | SOMEWHAT MANY | 4% OR LESS | +0.25 | | |

FIG. 11

| GENRE | TEMPLATE | DYNAMIC/STATIC | COOL/CUTE | EMOTIONAL/RATIONAL |
|---|---|---|---|---|
| TRAVEL | RESORT | -0.875 | 0.250 | -0.875 |
| TRAVEL | CITY | 0.000 | 0.375 | -0.625 |
| WEDDING | MODERN | 0.625 | 0.250 | 0.500 |
| WEDDING | CUTE | 0.750 | -0.875 | 0.500 |
| WEDDING | MODE | 0.000 | 0.500 | 0.125 |
| WEDDING | JAPANESE STYLE | -0.625 | 0.000 | 0.750 |
| LIFE | OLD DAYS | -0.875 | 0.500 | -0.750 |
| LIFE | PET | 0.250 | -0.750 | 0.250 |
| KIDS | SUMMER HOLIDAY | 0.375 | -0.625 | 0.250 |
| KIDS | ENTRANCE CEREMONY | -0.125 | -0.125 | -0.250 |
| SPORT | SEASIDE | 0.750 | 0.625 | 0.125 |
| SPORT | SNOW | 0.500 | 0.125 | 0.375 |
| SPORT | SCUBA | -0.875 | 0.125 | -0.375 |
| EVENT | CLUB EVENT | 1.000 | 0.875 | -0.125 |
| EVENT | MESSAGE | -0.875 | 0.125 | 0.750 |
| EVENT | PRESENTATION | -0.750 | 0.375 | -0.500 |

INFORMATION PROCESSING APPARATUS, INFORMATION PROCESSING METHOD, AND PROGRAM

CROSS-REFERENCE TO RELATED APPLICATION

The present application claims priority from Japanese Patent Application No. JP 2010-034915 filed in the Japanese Patent Office on Feb. 19, 2010, the entire content of which is incorporated herein by reference.

BACKGROUND OF THE INVENTION

1. Field of the Invention

The present invention relates to an information processing apparatus, an information processing method, and a program.

2. Description of the Related Art

In recent years, information processing apparatuses which create short movies from image data have been provided. In such information processing apparatuses, there are some apparatuses each of which has multiple templates whose dramatizing method (for example, timing of switching image data, switch-over method, visual effects, and BGM) for the short movie are decided beforehand, and has a function of creating the short movie by using the template selected by the user.

As for the selection method of the template, there is generally used a method of selecting a template by imagining an image from a name attached to the template (for example, "travel/resort", "kids/birthday") by a user, or a method of selecting a template by viewing a sample movie of the template by the user.

Further, on the other hand, there is also proposed technology for a device to automatically select a template to be used for creating a short movie. For example, in the web page of http://www.sony.jp/taiken/xsb_online/details.html, searched Feb. 3, 2010, there is disclosed a method of selecting a template by using information of a shooting date and time of a photograph. According to the method, for example, when the shooting date and time of the photograph is April, a template of cherry blossoms is automatically selected. Further, for example, JP-A-2005-25715 discloses a method in which a representative color of an image is decided and then based on the representative color, a template is selected.

SUMMARY OF THE INVENTION

However, there was an issue that it was difficult to select appropriately and efficiently a combination of image data serving as a material used for creating a short movie and a template.

For example, in the case of selecting a template from a name attached to the template, it was difficult to select the template suited to contents of image data, because the template is selected without watching a specific dramatizing method. If the created short movie was reproduced and a user felt uncomfortable or dissatisfied with the work, it was necessary that the user again select another template from the name, create a short movie, and reproduce the short movie, which involved a great amount of time and effort.

On the other hand, by using a function of viewing sample movies, a specific dramatizing method can be confirmed without actually creating a short movie. Also in this case, however, although time taken for creating the short movie can be shortened, it takes a great amount of time and effort to view the sample movie. In particular, in the case where templates were available in a large amount, time taken for viewing sample movies increased. Further, the sample movie is created by predetermined sample content, and hence, the user has no choice but to imagine the results of the case of replacing the predetermined sample content with the user's content.

In addition, in the above-mentioned device which automatically selects a template, the template desired by the user may not be selected, and in that case, the user ended up selecting a template manually.

In light of the foregoing, it is desirable to provide an information processing apparatus, an information processing method, and a program which are novel and improved, and which are capable of selecting appropriately and efficiently a combination of image data serving as a material used for creating a short movie and a template.

According to an embodiment of the present invention, there is provided an information processing apparatus which includes an analysis section which extracts image information of image data, and which analyzes, based on the extracted image information, a theme per image data group including a plurality of pieces of the image data, and a selection section which selects a combination of predetermined processing which is stored in association with the theme and the image data group based on the theme.

The theme as used herein refers to atmosphere and impression that a target (here, an image data group) has, which can be felt when viewing the target. In the above configuration, the information processing apparatus can grasp the theme of the image data group and the theme of the predetermined processing on the same criterion. Therefore, it becomes possible to select the combination of the image data group and the predetermined processing (for example, a template for creating a short movie) based on the theme. Accordingly, it becomes possible to grasp a feature of pieces of image data, the pieces of image data being some kind of gathering.

In addition, the analysis section may calculate a plurality of feature amounts by analyzing a feature of the image information based on a predetermined evaluation criterion, and may decide the theme based on the plurality of feature amounts.

In addition, the analysis section may calculate a feature amount based on a ratio of image data in which the image information has a predetermined feature out of pieces of image data included in an image data group.

In addition, the theme may be shown in a feature amount space based on a plurality of feature axes each representing a predetermined evaluation criterion. The selection section may select the combination based on a distance between a feature point of the image data group and a feature point of the theme associated with the predetermined processing.

In addition, the information processing apparatus may further include a control section which acquires, from a plurality of image data groups, an image data group to be subjected to the predetermined processing, and which controls the analysis section to analyze a theme of the acquired image data group. The selection section may select, from among pieces of predetermined processing which are each stored in association with the theme, the predetermined processing based on the theme of the acquired image data group.

In addition, the information processing apparatus may further include a control section which acquires predetermined processing to be executed from among the pieces of predetermined processing which are each stored in association with the theme, and which controls the selection section to select an image data group based on the acquired predetermined processing. The selection section may select an image data group from among the image data group based on a theme of the acquired predetermined processing.

In addition, the predetermined processing may be processing for creating a short movie from the image data group.

In addition, the information processing apparatus may further include a control section which shows a position in the feature amount space of a feature point of the theme associated with the predetermined processing and a position in the feature amount space of a feature point of the theme of the image data group, and which causes a screen for selecting the predetermined processing to be displayed.

In addition, the image data group may include a plurality of pieces of image data which are brought together beforehand as a series of events based on a predetermined criterion.

In addition, according to another embodiment of the present invention, there is provided an information processing apparatus which includes an analysis section which analyzes, based on image information extracted from image data, a theme per image data group including a plurality of pieces of the image data, and a selection section which selects the image data group based on a theme of a selected predetermined processing.

In addition, according to another embodiment of the present invention, there is provided an information processing method, which is realized by causing arithmetic processing means of an information processing apparatus to execute predetermined processing, the predetermined processing including the steps of extracting image information of image data, analyzing, based on the extracted image information, a theme per image data group including a plurality of pieces of the image data, and selecting a combination of predetermined processing which is stored in association with the theme and the image data group based on the theme.

In addition, according to another embodiment of the present invention, there is provided a program for causing a computer to function as an analysis section which extracts image information of image data, and which analyzes, based on the extracted image information, a theme per image data group including a plurality of pieces of the image data, and a selection section which selects a combination of predetermined processing which is stored in association with the theme and the image data group based on the theme.

According to the embodiments of the present invention described above, a combination of image data serving as a material used for creating a short movie and a template can be selected appropriately and efficiently.

BRIEF DESCRIPTION OF THE DRAWINGS

FIG. 2 is an explanatory diagram on processing performed by a subject information-analysis section;

FIG. 7 is an explanatory diagram showing an example of scene identification;

FIG. 10 is a table showing relationships between image information and the themes;

FIG. 11 is a table showing examples of the themes of templates;

DETAILED DESCRIPTION OF THE EMBODIMENTS

Figure 1:
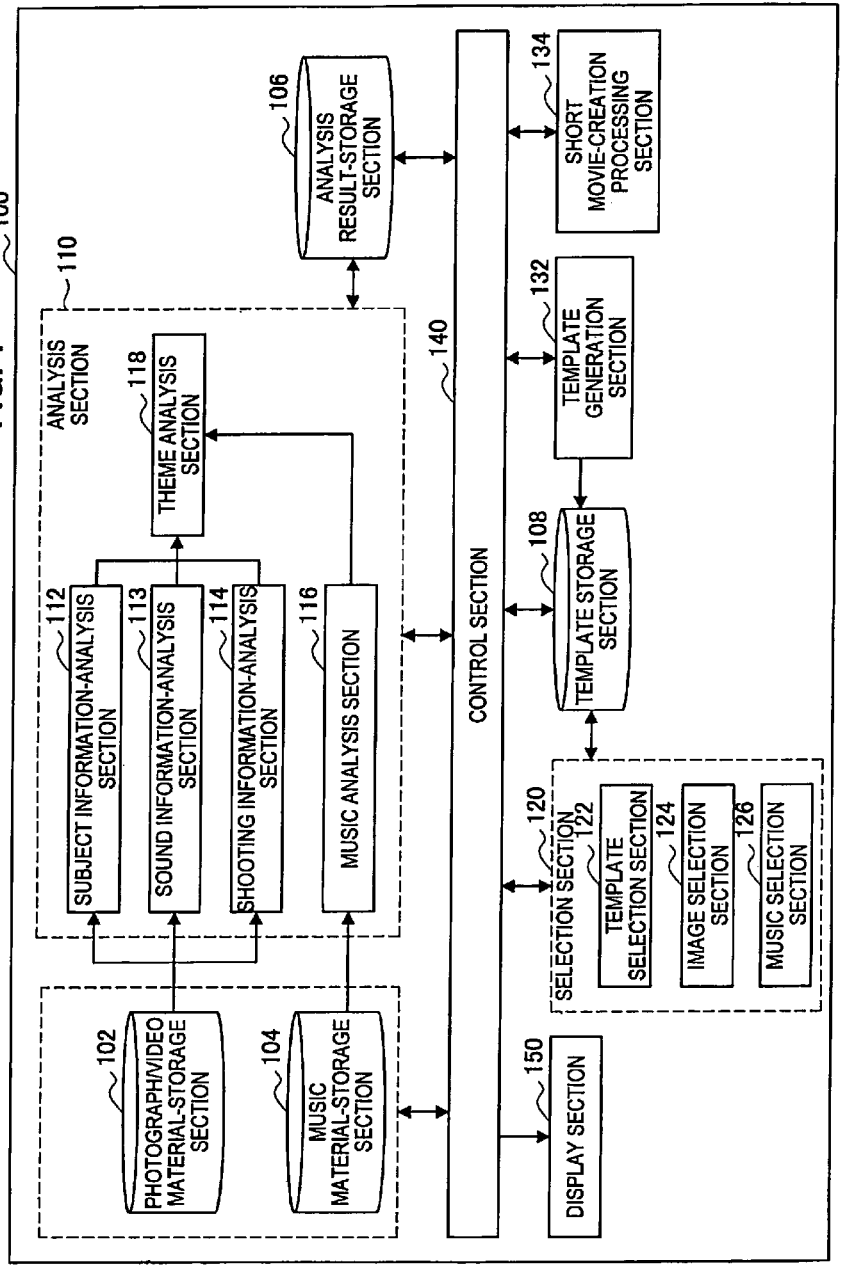
FIG. 1 is a block diagram showing a configuration of an information processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.

1. Functional configuration
   2. Operation examples
   2-1. Example of automatically selecting template from image data group (operation example 1)
   2-2. Example of automatically selecting image data group from template (operation example 2)
   2-3. Example of automatically selecting template from music (operation example 3)
   2-4. Automation of operation (operation example 4)
   2-5. Automation of operation (operation example 5)
   3. Examples of effects <1. Functional Configuration>

First, with reference to FIG. 1, a functional configuration of an information processing apparatus according to an embodiment of the present invention will be described. FIG. 1 is a block diagram showing a configuration of the information processing apparatus according to the embodiment of the present invention.

Note that, in the description below, materials refer to overall media data of various types such as photographs, videos, sounds, and music, and also include tag information such as labels attached thereto. A photograph is formed of a single image, and a video is formed of multiple time-series images and sound. Consequently, in the case where it is simply expressed as "image", it refers to both images, that is, the photograph and the video. Further, the music refers to music used as a material of a short movie as BGM. For example, the music has rhythms and melodies. However, sound effects are also included in the music. On the other hand, it will be stated as "sound" when it is recorded in a video.

An information processing apparatus 100 according to an embodiment of the present invention mainly includes a photograph/video material-storage section 102, a music material-storage section 104, an analysis section 110, an analysis result-storage section 106, a template storage section 108, a selection section 120, a template generation section 132, a short movie-creation processing section 134, a control section 140, and a display section 150.

In addition, the selection section 120 further includes a template selection section 122, an image selection section 124, and a music selection section 126.

The photograph/video material-storage section 102, the music material-storage section 104, the analysis result-storage section 106, and the template storage section 108 are each a device for storing data which may include a storage medium, a recording device for recording the data in the storage medium, a reading device for reading out the data from the storage medium, and a deletion device for deleting the data recorded in the storage medium. The photograph/video material-storage section 102, the music material-storage section 104, the analysis result-storage section 106, and the template storage section 108 may be each realized as a separate storage medium, or may be realized by one storage medium. Examples of the storage medium include, but are not limited to, a magnetic recording medium such as an HDD (Hard Disk Drive), and a non-volatile memory such as an EEPROM (Electronically Erasable and Programmable Read Only Memory), a flash memory, an MRAM (Magnetoresistive Random Access Memory), a FeRAM (Ferroelectric Random Access Memory), and a PRAM (Phase change Random Access Memory).

The photograph/video material-storage section 102 stores image and sound materials such as photographs and videos, the music material-storage section 104 stores music materials, the analysis result-storage section 106 stores analysis results obtained from respective sections in the analysis section 110, and the template storage section 108 stores templates for creating a short movie in association with themes.

The analysis section 110 further includes a subject information-analysis section 112, a sound information-analysis section 113, a shooting information-analysis section 114, a music analysis section 116, and a theme analysis section 118. The subject information-analysis section 112, the sound information-analysis section 113, and the shooting information-analysis section 114 are each an analysis section which extracts image information by analyzing image and sound materials such as photographs and videos, and the music analysis section 116 is an analysis section which extracts music data information by analyzing music materials. The theme analysis section 118 has a function of analyzing a theme of each image data group based on the image information and the music data information, which are the analysis results obtained from the subject information-analysis section 112, the sound information-analysis section 113, the shooting information-analysis section 114, and the music analysis section 116.

The subject information-analysis section 112 has a function of extracting image information by analyzing a feature of a subject in an image of a photograph or a video which is input in accordance with control of the control section 140. For example, the subject information-analysis section 112 may analyze the feature of the subject by image analysis/recognition technology, or may analyze the feature of the subject by using label (tag) information attached to the image. Alternatively, there can be extracted time-series information related to operation, movement, and change, which is obtained by following the subject by analyzing the video.

Figure 3:
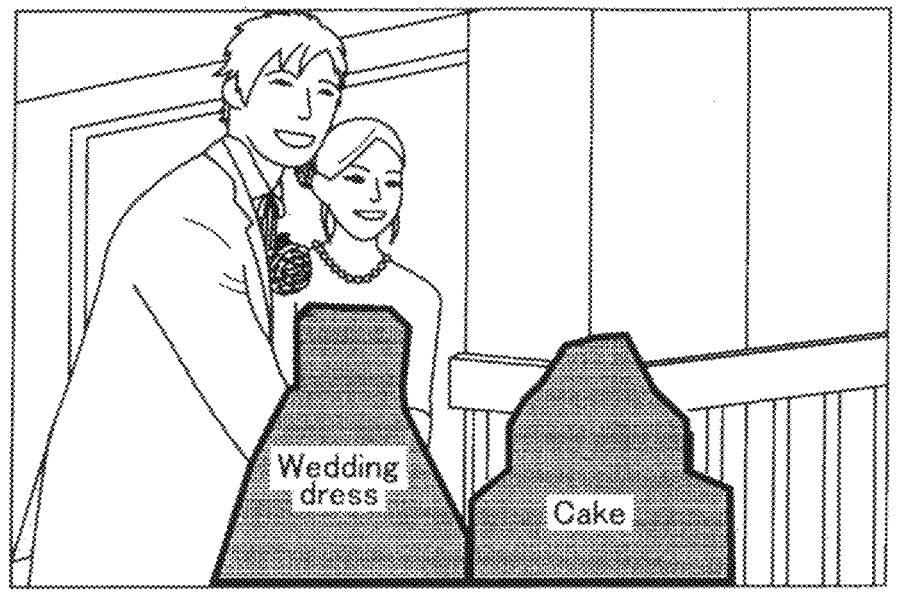
FIG. 3 is an explanatory diagram showing an example of item recognition by object identification.
Figure 4:
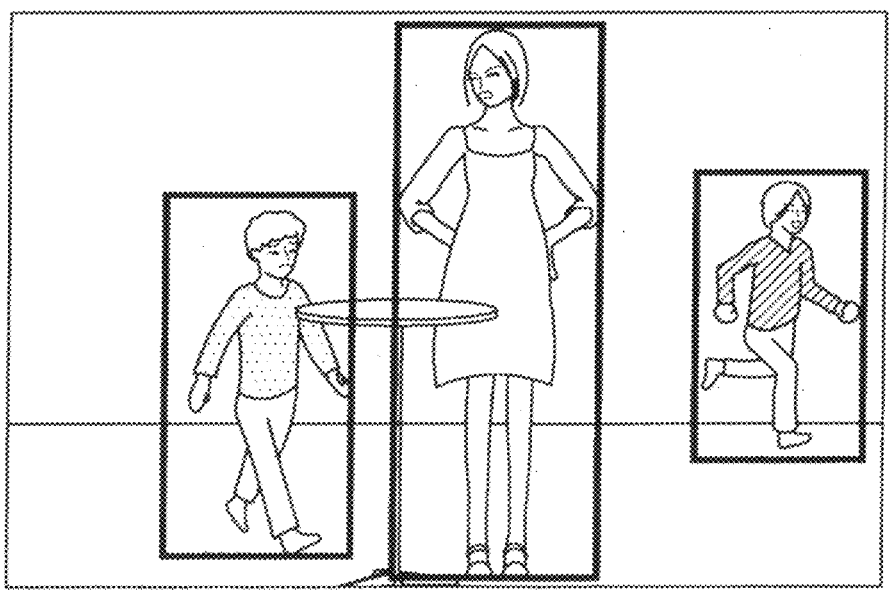
FIG. 4 is an explanatory diagram showing an example of human shape recognition by the object identification.
Figure 5:
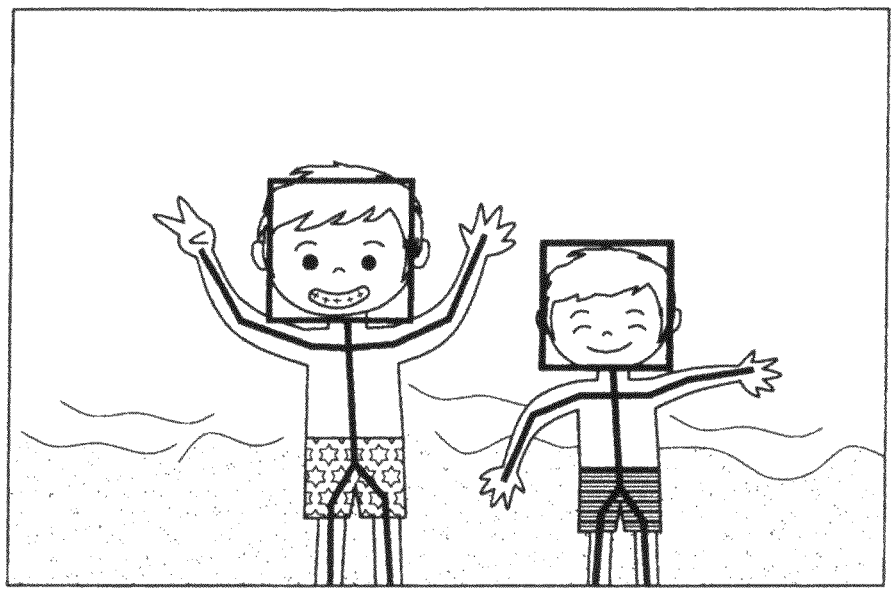
FIG. 5 is an explanatory diagram showing an example of posture recognition by the object identification.
Figure 6:
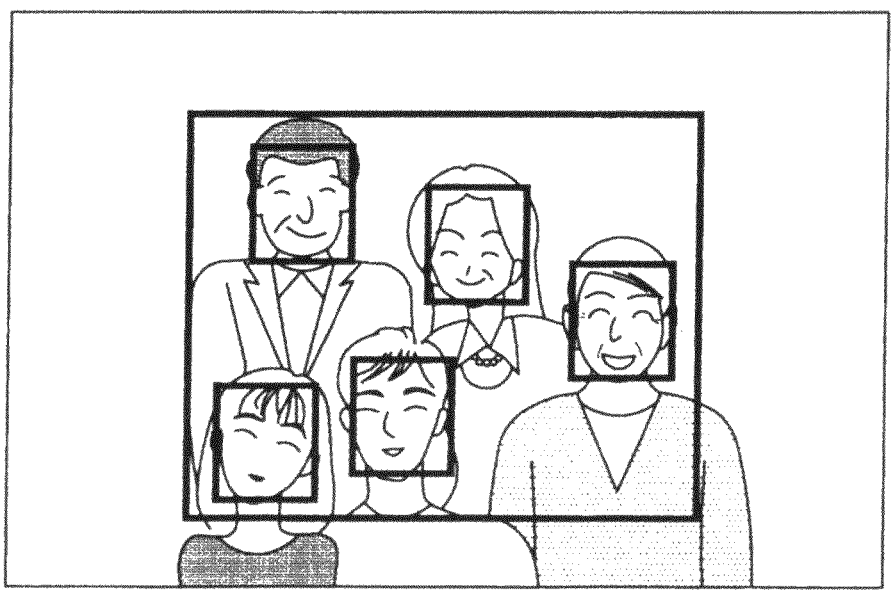
FIG. 6 is an explanatory diagram showing an example of facial recognition by the object identification.

Hereinafter, by using FIGS. 2 to 7, there will be specifically described functions of the subject information-analysis section 112 in the case of analyzing feature of a subject by the image analysis/recognition technology. FIG. 2 is an explanatory diagram illustrating processing of the subject information-analysis section 112. FIG. 3 is an explanatory diagram showing an example of item recognition by object identification. FIG. 4 is an explanatory diagram showing an example of human shape recognition by the object identification. FIG. 5 is an explanatory diagram showing an example of posture recognition by the object identification. FIG. 6 is an explanatory diagram showing an example of facial recognition by the object identification. FIG. 7 is an explanatory diagram showing an example of scene identification.

As shown in FIG. 2, the subject information-analysis section 112 classifies the input images into images which mainly include humans and/or items and images which mainly include scenes. Then, the subject information-analysis section 112 performs object identification processing to the images which mainly include humans and/or items, and performs scene identification processing to the images which mainly include scenes. Moreover, for an image which mainly includes humans and/or items, in the case where a background portion after removing the objects has a large area, the scene identification processing may be performed to the background portion.

In the object identification processing, for example, a feature amount is extracted from a target image, and whether or not an object to be an identification target is included is identified by using a model constructed by machine learning. For example, by the object identification processing, it is identified from the image shown in FIG. 3 that a wedding dress and a cake are included.

Then, in the case where a human is included in the target image, the image analysis may be further performed, thereby performing human shape recognition, facial recognition, and posture recognition. For example, by recognizing human shapes from the photograph shown in FIG. 4, the number of humans in the photograph and a composition of the humans can be identified. Alternatively, by recognizing postures from the photograph shown in FIG. 5, poses of the humans can be identified. Further, by using technology of facial recognition or the like in the photograph shown in FIG. 6, the number of humans and expressions of the humans can be recognized, and recognition of individuals can also be performed.

In this way, in the case of a photograph whose subject is an item, the subject information-analysis section 112 is capable of identifying whether the item is "signboard", "food", "plant", "animal", "vehicle", "sports equipment", or "musical instrument", and extracting the item as the image information, for example. Alternatively, in the case of a photograph whose subject is a human, the subject information-analysis section 112 is capable of extracting, as the image information, information related to "individual identification", "face", "human shape", "sex", "age", "expression", "posture", "costume", "number of humans", "alignment", and the like, for example.

On the other hand, in the scene identification processing, a scene of an input image is identified based on a feature amount extracted from the image in accordance with a model, machine-learned beforehand from images for learning purpose. At that time, machine learning using SVM (Support Vector Machines), for example, can be used. According to the scene identification processing, the subject information-analysis section 112 can identify whether the scene of the input image is "city", "indoors", "outdoors", "coast", "underwater", "night scene", "sunset", "snow scene", or "crowd", for example. For example, there are extracted pieces of image information indicating that the upper diagram of FIG. 7 is a "field" scene, the middle diagram is an "underwater" scene, and the bottom diagram is a "sunset" scene.

In addition, the subject information-analysis section 112 can also extract, by the image analysis as the image information, pieces of information such as "presence/absence of subject", "composition", "good/bad", "failure (out of focus, blur)", "impression", and "user's individual preference".

Next, the sound information-analysis section 113 has a function of extracting image information by analyzing sound data included in video materials. Here, since the information obtained by analyzing sound is information attached to images called video, the information is referred to as image information. For example, by using sound analysis technology and recognition technology, the sound information-analysis section 113 can extract pieces of information of "speaker", "voice pitch", "contents of speaking voice", "emotion in voice tone", "surrounding environmental sound", and "extensiveness of space by echo".

The shooting information-analysis section 114 has a function of extracting image information by analyzing shooting information of photograph data and video data. Here, for example, in the case of a photograph taken by a digital still camera, the shooting information refers to EXIF (EXchangeable Image File Format) information, and in the case of a video taken by a video camera, the shooting information refers to information held as metadata and as user private data. Specifically, examples of the shooting information include "shooting date/time", "camera model", "camera settings", "vertical shooting/horizontal shooting", "with/without flash, and "GPS (Global Positioning System) information". Further, the shooting information also includes distance from a subject, state of blurring, and movement information of the photographing/filming device, which are obtained by the sound analysis technology and the recognition technology. Alternatively, the shooting information also includes information such as an address obtained from map information based on the GPS information.

For example, the shooting information-analysis section 114 extracts a time period in which the image is shot as image information by analyzing the shooting information. Alternatively, the image information may be extracted based on shooting position information obtained from the GPS information.

The theme analysis section 118 analyzes a theme of each image data group based on the extracted image information as results of analyses performed in the subject information-analysis section 112, the sound information-analysis section 113, and the shooting information-analysis section 114. The theme as used herein refers to, as described above, atmosphere and impression that a target (here, an image data group) has, which can be felt when viewing the target. In the present embodiment, the theme is expressed by a point in a feature amount space which is defined by multiple feature axes. As described above, a template for creating a short movie is stored beforehand in association with a theme. Consequently, since the theme of the template and the theme of the image data group are expressed by points in a feature amount space which is defined by the same feature axes, it becomes possible to compare the template with the image data on the same criterion of the theme. Further, by expressing the feature axis in adjectives such as "cute/cool" here, for example, it becomes possible for the user to grasp intuitively a feature of the image data group and the template.

Figure 8:
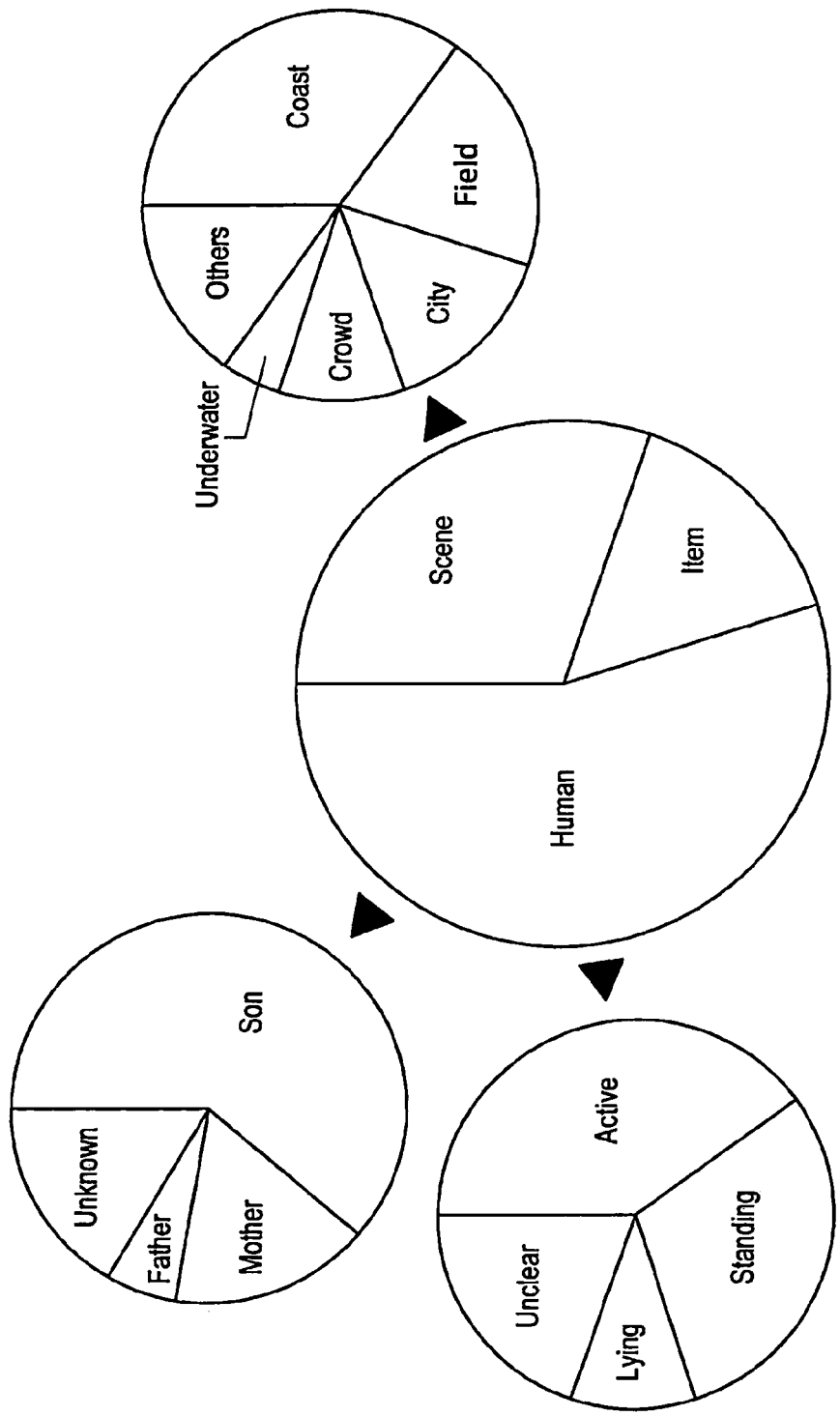
FIG. 8 is an explanatory diagram of a theme analysis.

The theme analysis section 118 analyzes distribution of the image information extracted from individual images included in the image data group which is the analysis target. Here, the distribution of the image information refers to a ratio of the images having a predetermined feature out of the image data group based on the image information. For example, as shown in FIG. 8, the theme analysis section 118 analyzes the ratio between "human", "item", and "scene" among an image data group. In addition, the theme analysis section 118 performs individual identification for the images in which a human is photographed, and analyzes the ratio between "son", "mother", "father", and "unknown" and the ratio between postures of the humans. Moreover, for the images of scenes, the theme analysis section 118 analyzes by scene identification the ratio between "coast", "field", "town", "crowd", "underwater", and "others". Alternatively, based on the image information extracted by the sound information-analysis section 113, the theme analysis section 118 analyzes the ratio of laughter being included, the ratio of noises of a pet being included, and the like. Further, the theme analysis section 118 analyzes, based on the image information extracted by the shooting information-analysis section 114, the ratio of images aimed for soft-focus, the ratio of images shot by changing the camera settings from default settings, and the like.

Here, the image data group refers to a photograph/video group brought together as a series of events based on some kind of rule. For example, the rule as used herein may be a rule based on information such as "shooting date, week, month, and year", "folder sorted by user or application", "tag which is attached to multiple images for the purpose of distinguishing an event, the images being recognized by the user to be belonging to the same event", "automatically recognized event based on density of shooting time period".

Figure 9:
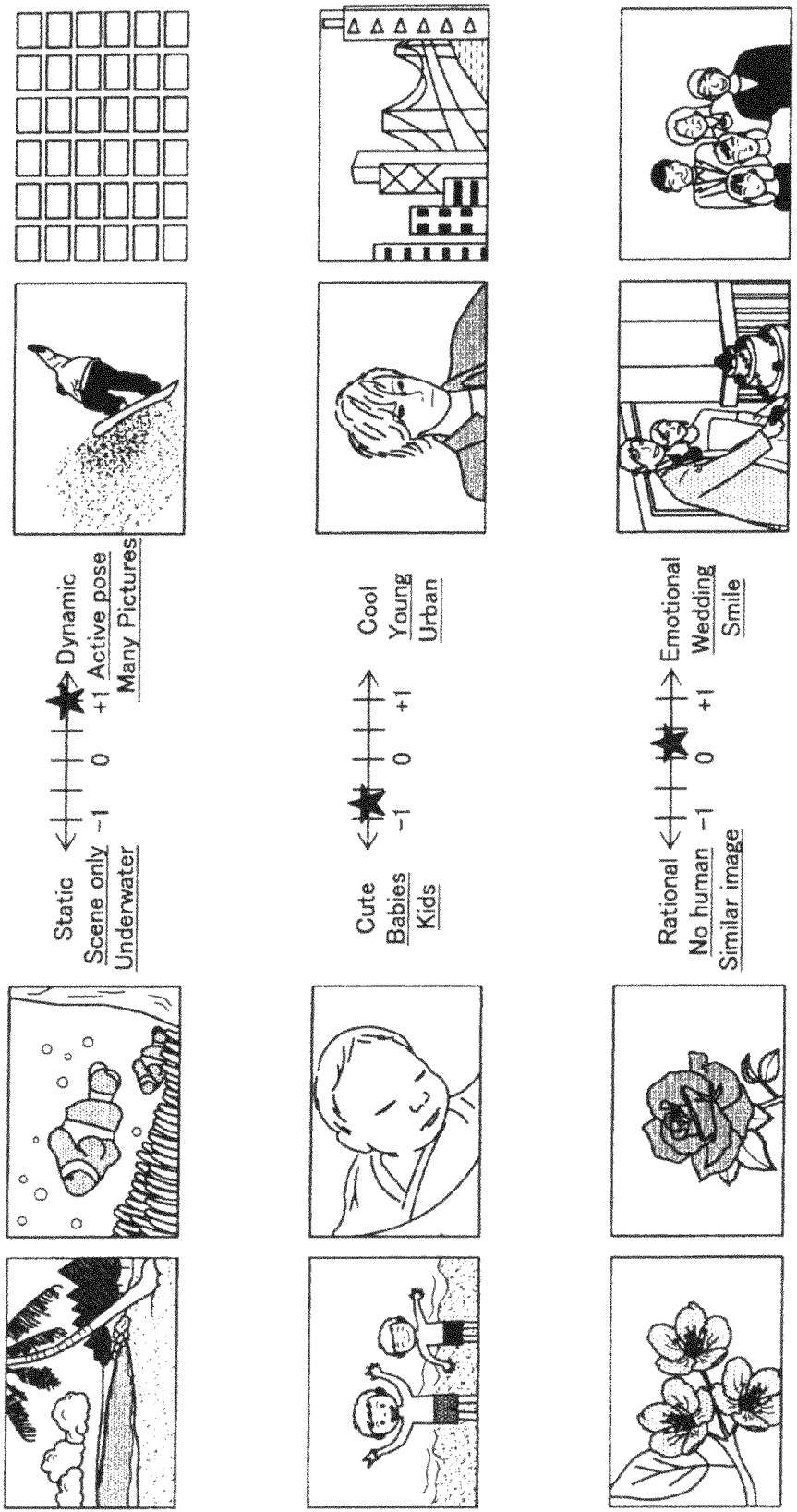
FIG. 9 is an explanatory diagram showing examples of themes.

Then, the theme analysis section 118 calculates a feature value on a predetermined feature axis depending on the distribution of the image information. Here, as the predetermined feature axis, there may be used multiple feature axes as shown in FIG. 9, for example. In the example shown in FIG. 9, there are three feature axes of "static/dynamic", "cute/cool", and "rational/emotional". It is preferred that those feature axes each have a pair of opposite indices. For example, other examples of the feature axes include "sophisticated/rough", "gorgeous/simple", "classical/innovative", and "profound/superficial". The number of feature axes may be increased or decreased or different axes may be introduced, depending on the number and features of templates to be selection targets. By using the feature amount space configured from the multiple feature axes, the theme is numerically expressed.

For example, as a method of calculating the feature amount from the image information, there can be given a calculation method as shown in FIG. 10 involving deciding beforehand an increase-decrease value of each feature amount in the case where the image information has some kind of features, and increasing or decreasing the feature amount based on the evaluation criterion. According to the evaluation criterion of FIG. 10, for example, based on the image information, the feature amount of the emotional/rational axis is increased by 0.5 in the case where the ratio of the images of smiling people is 50% or more. At that time, the default of the feature amount is set to 0, and the feature amount is adjusted in a manner that the value becomes positive in the case of having an emotional feature and the value becomes negative in the case of having a rational feature. In the same manner, in the case where the ratio of images, each of which mainly includes scene out of human, item, and scene, among the subjects in the image, is the largest, the feature amount of the dynamic/static axis is decreased by 0.25, the feature amount of the cool/cute axis is increased by 0.25, and, in addition, the value of the emotional/rational axis is decreased by 0.5.

Here, for the purpose of reference, FIG. 11 shows specific examples of themes stored in association with templates. FIG. 11 is a table showing examples of the themes of templates. Here, a value of each feature amount of the theme is set between −1 and +1 for normalization. Note that, in order that the maximum absolute value out of respective feature amounts become "1" or "−1", the normalization here may be performed by dividing a value of each feature amount by the maximum value of the absolute value of the feature amount. Alternatively, the normalization may be clipping processing in which all the values equal to or more than "+1" are simply set to +1 and all the values equal to or less than "−1" are simply set to −1.

For example, in the example shown in FIG. 11, all templates in a genre of "wedding" have high "emotional" values. However, among the templates in the same "wedding" genre, the template named "modern" and the template named "cute" have high "dynamic" values, and on the other hand, the template named "Japanese style" has a high "static" value. In this way, the template and the image data group are evaluated by values on the same criterion, to thereby compare the template with the image data group based on a theme, and hence, it becomes possible to automatically select a combination of the template and the image data group. Further, also in the case of manually selecting a template or an image data group, there is an effect that the comparison can be performed by an intuitive index.

Further, although not shown, the theme analysis section 118 may further use the image information output as a result of the analysis in the sound information-analysis section 113, and may calculate a feature amount in accordance with a predetermined evaluation criterion. For example, from the analysis results of sounds, there can be exemplified relationships of "dynamic, when the ratio of cheering is high", "cute, when the ratio of noises of a pet is high", and "emotional, when the ratio of laughter is high". The theme analysis section 118 reflects those relationships on the numerical values of the feature amounts.

Further, the music analysis section 116 analyzes music materials stored in the music material-storage section 104 in accordance with an instruction from the control section 140. Here, as a method of analyzing music, there may be used various existing techniques in combination. Examples of the analysis method include a tune analysis and a lyric analysis.

The selection section 120 further includes the template selection section 122, the image selection section 124, and the music selection section 126. The selection section 120 has a function of selecting a combination of a template and image data by the template selection section 122 and the image selection section 124 based on a theme. The template selection section 122 selects a template to be used for creating a short movie. The template selection section 122 selects the template by a method in accordance with an instruction from the control section 140. For example, the template selection section 122 has a function of selecting the template based on operation information input by the user using an input section (not shown). Further, the template selection section 122 has a function of selecting the template based on a theme of an image data group selected by the image selection section 124. Alternatively, the template selection section 122 may select a template based on a music material and detection information of an event which is to be a trigger for starting short movie creation. In the case of selecting the template based on a theme, a template having most similar theme (a point in a feature amount space which is defined by multiple feature axes) may be selected, for example, and a template may be selected from among templates whose theme is within a predetermined distance in accordance with another criterion, for example.

The image selection section 124 selects image data to be used for creating a short movie. The image selection section 124 selects image data by a method in accordance with an instruction from the control section 140. For example, the image selection section 124 has a function of selecting the image data based on operation information input by the user using an input section (not shown). Further, the image selection section 124 has a function of selecting the image data based on the theme of the template selected by the template selection section 122. The image selection section 124 may select image data individually or as an image data group.

The music selection section 126 selects music to be used for creating a short movie. The music selection section 126 selects music by a method in accordance with an instruction from the control section 140. For example, the music selection section 126 has a function of selecting the music based on operation information input by the user using an input section (not shown). Further, the music selection section 126 has a function of selecting the music based on a theme of the image data group and the template. Alternatively, in the case where music to be used is set in the template beforehand, the set music may be selected.

The template generation section 132 has a function of generating a template to be used for creating a short movie in accordance with control of the control section 140. For example, the template generation section 132 generates the template based on the theme of the image data group selected by the image selection section 124. For example, based on the theme of the selected image data group, the following templates are generated: a template including a component indicating fast screen switching when the feature amount of "dynamic" is high; a template including a component indicating addition of a cute illustration when the feature amount of "cute" is high; and a template including a component indicating gentle and rhythmical switching of screens when the feature value of "rational" is high.

The short movie-creation processing section 134 executes short movie-creation processing in accordance with control of the control section 140 by using the template selected by the template selection section 122 and the image data selected by the image selection section 124. Specifically, the short movie-creation processing includes processing of selecting materials to be actually used for creating the short movie and processing of deciding an order of using materials from among a selected material group. For example, the short movie-creation processing section 134 may select materials based on a ratio proportional to the feature amount of each feature axis of the template. For example, in the case where the selected template has a feature amount of the dynamic/static axis of +0.5, the short movie-creation processing section 134 selects materials in such a manner that 75% of dynamic materials and 25% of static materials are included. Alternatively, in order to emphasize a directionality of each axis of the template, the short movie-creation processing section 134 may select only the materials which belong to one side of the indices. For example, in the case where a value of the feature amount of the dynamic/static axis is positive, only dynamic materials may be selected. Further, the short movie-creation processing section 134 may not select multiple photographs which have similar contents with each other. For example, there is a case where, at a travel destination, multiple photographs of a same subject are taken at a same location by slightly changing camera settings and compositions. When such multiple photographs are used one after another in a short movie, the short movie may become boring and monotonous. Therefore, in the case where there are multiple similar photographs, only the photograph which has the best photographing state (which is determined based on whether it is good or bad as a photograph in terms of focus and composition) may be selected.

Further, the short movie-creation processing section 134 decides the order of using materials from among the selected image data group. For example, in a short movie, the impression of the first image and the last image on a viewer is particularly large. Consequently, major images among the image data group are preferably used as the first image and the last image. As a method of selecting major images, there can be exemplified: a method involving determining whether or not the images suit the theme of the template; a method involving specifying a subject to be a main person by performing personal recognition of a subject and based on the appearance frequency thereof, and selecting an image which features the main person; or a method involving performing selection based on whether an image is good or bad as a photograph in terms of focus and composition. However, note that it is necessary to keep in mind that it may not be preferred to change the order of images in the case of using a template which emphasizes the flow of time.

Note that the short movie-creation processing section 134 may store the created short movie in a storage device, or may cause the created short movie to be displayed on the display section 150.

Figure 12:
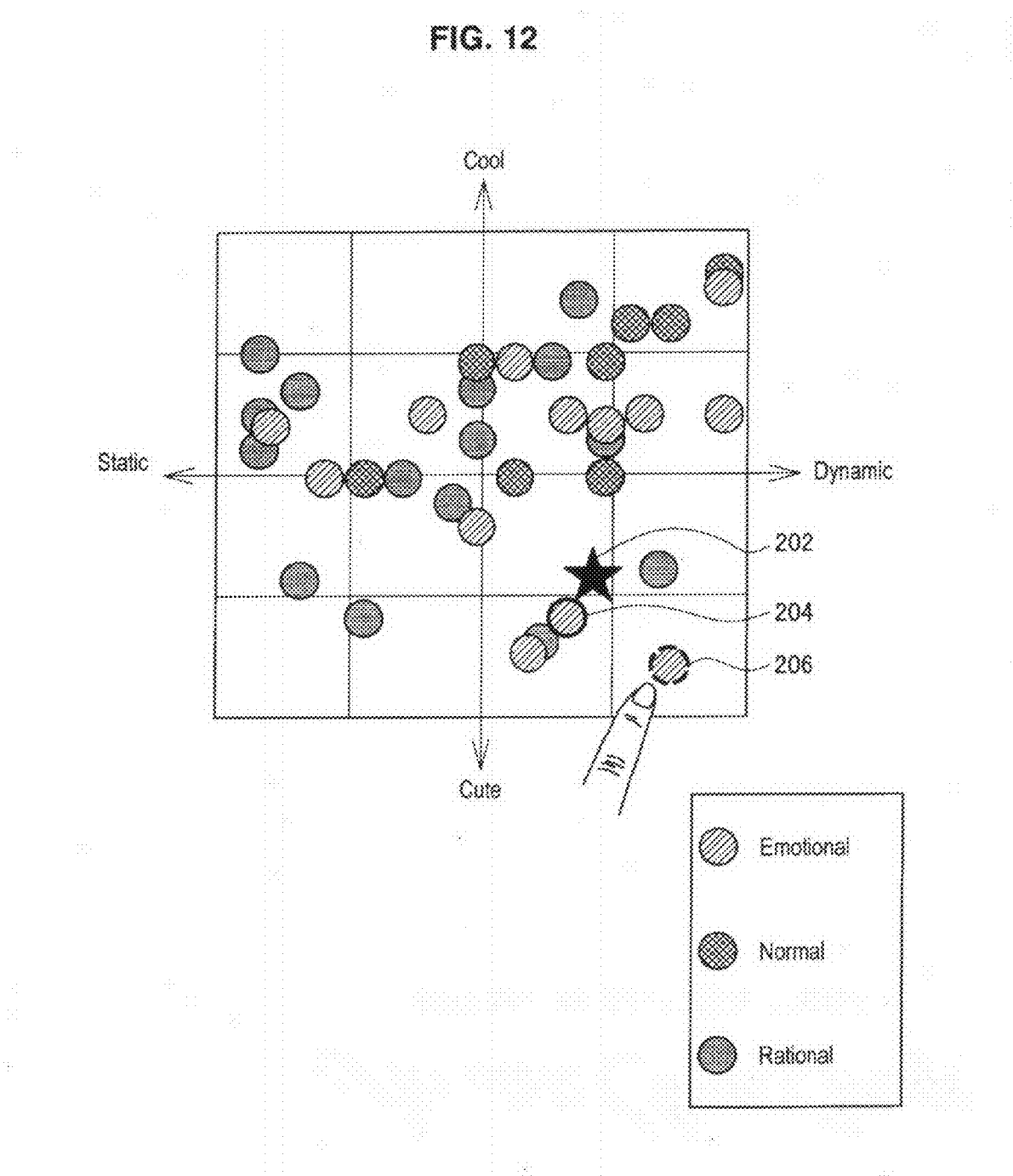
FIG. 12 is a diagram showing a display example of a template selection screen based on the themes.

The display section 150 is a display device which displays an image to the user in accordance with control of the control section 140. For example, the display section 150 may display a template selection screen as shown in FIG. 12. The template selection screen shown in FIG. 12 is a diagram showing positions in feature space which is formed by three feature axes. Here, since it is difficult to understand the relationship when three-dimensional space is used, the template selection screen is shown as follows: on a two-dimensional plane formed by two axes of "dynamic/static" and "cool/cute", values of "emotional/rational" are represented by dots having different patterns. For example, the theme of the image data group is represented by a star-shaped feature point 202, and a template automatically selected by the template selection section 122 based on the theme of the image data group is represented by a feature point 204. Referring to the template selection screen, the user may select another template. For example, in the case of desiring an image which is more dynamic and cute than the currently selected template represented by the feature point 204, a template represented by a feature point 206 may be selected.

The control section 140 has a function of controlling entire operation of the information processing apparatus 100. For example, by indicating to the analysis section 110 a material to be an analysis target, the control section 140 causes the analysis section 110 to analyze an image, a sound, shooting information, and music. Further, by indicating to the selection section 120 a selection criterion, the control section 140 causes the selection section 120 to select an image or a template to be used for creating a short movie. Alternatively, in the case where there is no template which is prepared beforehand or the case where the user performs an input for selecting not using the template prepared beforehand and generating a template, the control section 140 causes the template generation section 132 to generate a template by inputting a condition for generating the template to the template generation section 132. In addition thereto, the control section 140 controls various types of operation for creating a show and a movie by controlling respective functional sections. Specific operation examples of the control section 140 will be described in detail in "operation examples" below.

<2. Operation Examples>

Next, short movie-creation processing performed by an information processing apparatus 100 according to an embodiment of the present invention will be described by using five examples shown in FIGS. 13 to 17. FIGS. 13 to 17 are different from each other mainly in terms of methods of selecting a trigger for starting short movie creation, a material to be used for creating a short movie, and a template.

[2-1. Example of Automatically Selecting Template from Image Data Group (Operation Example 1)]

Figure 13:
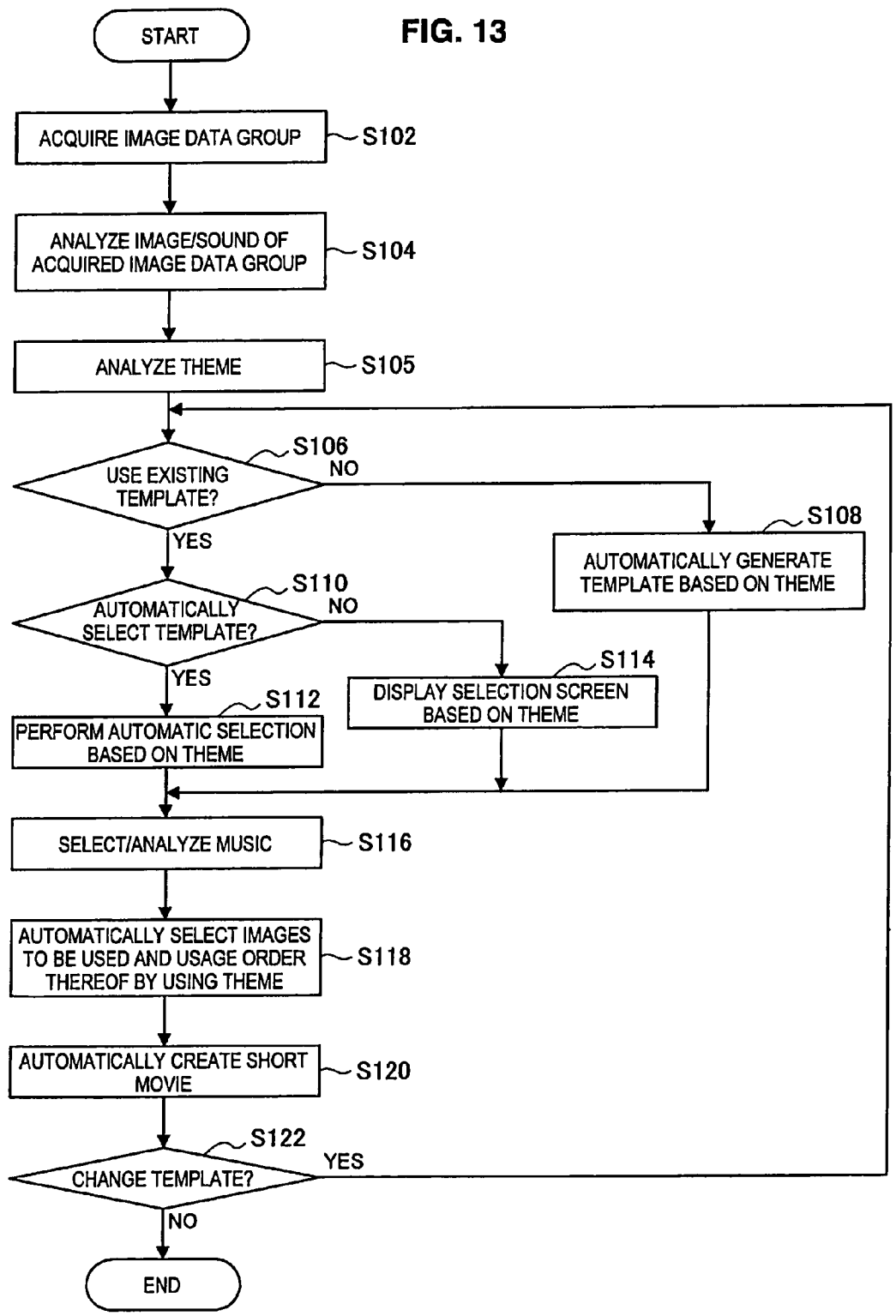
FIG. 13 is a flowchart showing an operation example in which creation of a short movie starts from selecting an image data group.

First, FIG. 13 is an explanatory diagram showing short movie-creation operation in the information processing apparatus 100 in the case where a user selects and inputs an image data group.

First, when the user performs operation of selecting an image data group of photographs or videos to be used for creating a short movie, the control section 140 acquires the operation information and causes the image selection section 124 to select the photographs and the videos which are indicated by the operation information as the image data group to be used for creating the short movie (S102). Then, the control section 140 causes the analysis section 110 to analyze image data and sound included in the image data group selected by the image selection section 124 (S104). After that, the control section 140 causes the analysis section 110 to analyze a theme from the results of the image/sound analysis (S105). Here, the control section 140 determines whether or not to use an existing template (S106), and in the case of not using the existing template, the control section 140 causes the template generation section 132 to generate a template based on the theme of the image data group, which is the analysis result in Step S104 (S108). The determination in Step S106 may be performed by confirming, by the control section 140, a set value which is set beforehand by an environmental setting, or may be performed by causing the user to select whether or not to use the existing template by using the display section 150 and based on the input information of the selection operation.

On the other hand, in the case where it is determined in Step S106 that the existing template is to be used, then whether or not to automatically select a template is determined (S110). In the same manner as in the case of Step S106, such a determination may be performed by confirming, by the control section 140, a set value which is set beforehand by an environmental setting, or may be performed by causing the user to select whether or not to use the existing template by using the display section 150 and based on the input information of the selection operation.

Here, in the case of automatically selecting a template, the control section 140 inputs the theme of the image data group, which is the analysis result in Step S104, to the template selection section 122, and causes the template selection section 122 to select the template based on the theme (S112). On the other hand, in the case of not automatically selecting a template, the control section 140 generates a selection screen based on the theme, and causes the display section 150 to display the selection screen (S114). The selection screen generated by the control section 140 is like a screen shown in FIG. 12, for example. Then, the control section 140 accepts the selection input of the user with respect to the selection screen by the template selection section 122, and causes the template selection section 122 to select the template based on the input information.

As described above, when the image data and the template to be used for creating the short movie are decided, next, the control section 140 causes the music selection section 126 to select music to be used for creating the short movie (S116). Here, the music selection section 126 may select the music based on selection input of the user, or may select the music based on, for example, the theme of the image and the template.

Next, the control section 140 causes the short movie-creation processing section 134 to select pieces of image data to be actually used for creating the short movie from among the image data group selected in Step S102 and to decide an order of using the pieces of image data (S118). All the pieces of image data in the image data group selected in Step S102 may be used for creating the short movie, or pieces of image data to be adopted for the short movie may be further selected from among the image data group.

After that, the control section 140 causes the short movie-creation processing section 134 to execute short movie-creation processing (S120). Then, the control section 140 causes the created short movie to be reproduced. The user views the reproduced short movie, and completes the processing when the completed short movie is satisfactory to the user, or, if the completed short movie is not satisfactory to the user, the user can also select to change the template (S122). In the case where the change of the template is selected, the processing returns to Step S106. For example, in the case where automatic selection of a template is executed, when changing of the template is selected, the control section 140 may control in a manner that the processing necessarily proceeds to Step S114 from Step S110. In this case, the selection screen shown in FIG. 12 is displayed.

In this way, according to the information processing apparatus 100, the short movie can be created by using the image data group manually selected by the user. At this time, since the template may be set to be automatically selected, the short movie can be created in one step of selecting an image data group at the shortest. Here, even in the case where the user is not satisfied with the completed short movie based on the automatically selected template, the information processing apparatus 100 can provide a method of intuitively selecting a template by a feeling, such as a "slightly more dynamic" template or a "slightly more emotional" template, by using the intuitive selection screen shown in FIG. 12.

[2-2. Example of Automatically Selecting Image Data Group from Template (Operation Example 2)]

Figure 14:
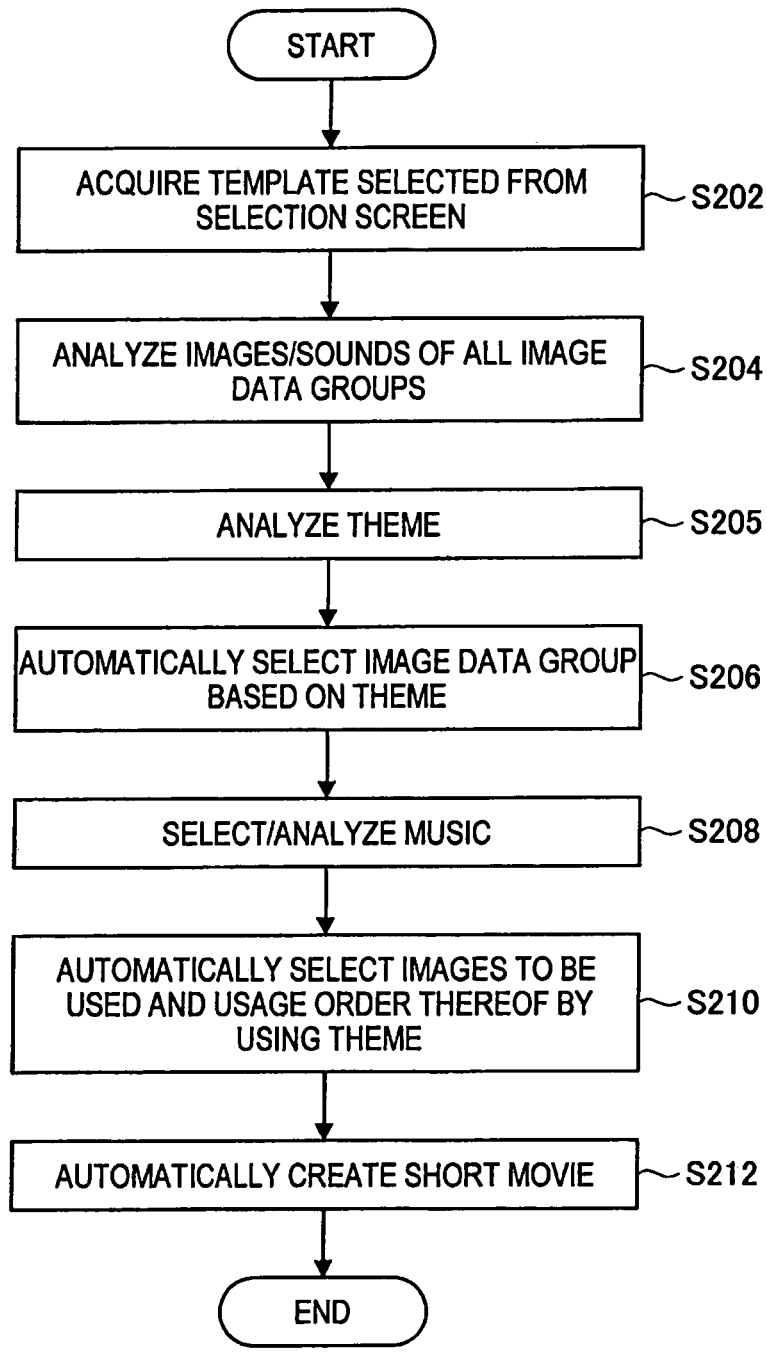
FIG. 14 is a flowchart showing an operation example in which the creation of the short movie starts from selecting a template.

Next, FIG. 14 is an explanatory diagram showing short movie-creation operation in the information processing apparatus 100 in the case where a user selects and inputs a template.

First, the control section 140 generates a selection screen by using themes stored with templates in the template storage section 108 beforehand, and causes the display section 150 to display the selection screen. When acquiring input information, which is selected by the user looking at the selection screen and referring to the values on the feature axes, the control section 140 causes the template selection section 122 to acquire the template indicated by the input information (S202). Then, the control section 140 causes the analysis section 110 to analyze images and sounds of all the image data groups (S204), and further causes the analysis section 110 to analyze themes based on the analysis results (S205). Then, the control section 140 causes the image selection section 124 to automatically select an image data group based on the theme of the template acquired in Step S202 (S206). Note that the analysis of the image data group may be omitted here in the case where the analysis is executed beforehand and the analysis results are stored in the analysis result-storage section 106.

Then, the control section 140 causes the music selection section 126 to select music to be used for creating a short movie (S208). Although music which is set beforehand for the selected template is selected here, the control section 140 may analyze candidate music as necessary and may cause the music selection section 126 to select music by using the analysis results of the template or the image data group and the analysis results of the music.

Then, the control section 140 causes the short movie-creation processing section 134 to select pieces of image data to be actually used for creating the short movie from among the image data group selected in Step S206 and to decide an order of using the pieces of image data (S210). All the pieces of image data in the image data group selected in Step S206 may be used for creating the short movie, or pieces of image data to be adopted for the short movie may be further selected from among the image data group. Further, the control section 140 causes the short movie-creation processing section 134 to execute short movie-creation processing (S212).

[2-3. Example of Automatically Selecting Template from Music (Operation Example 3)]

Figure 15:
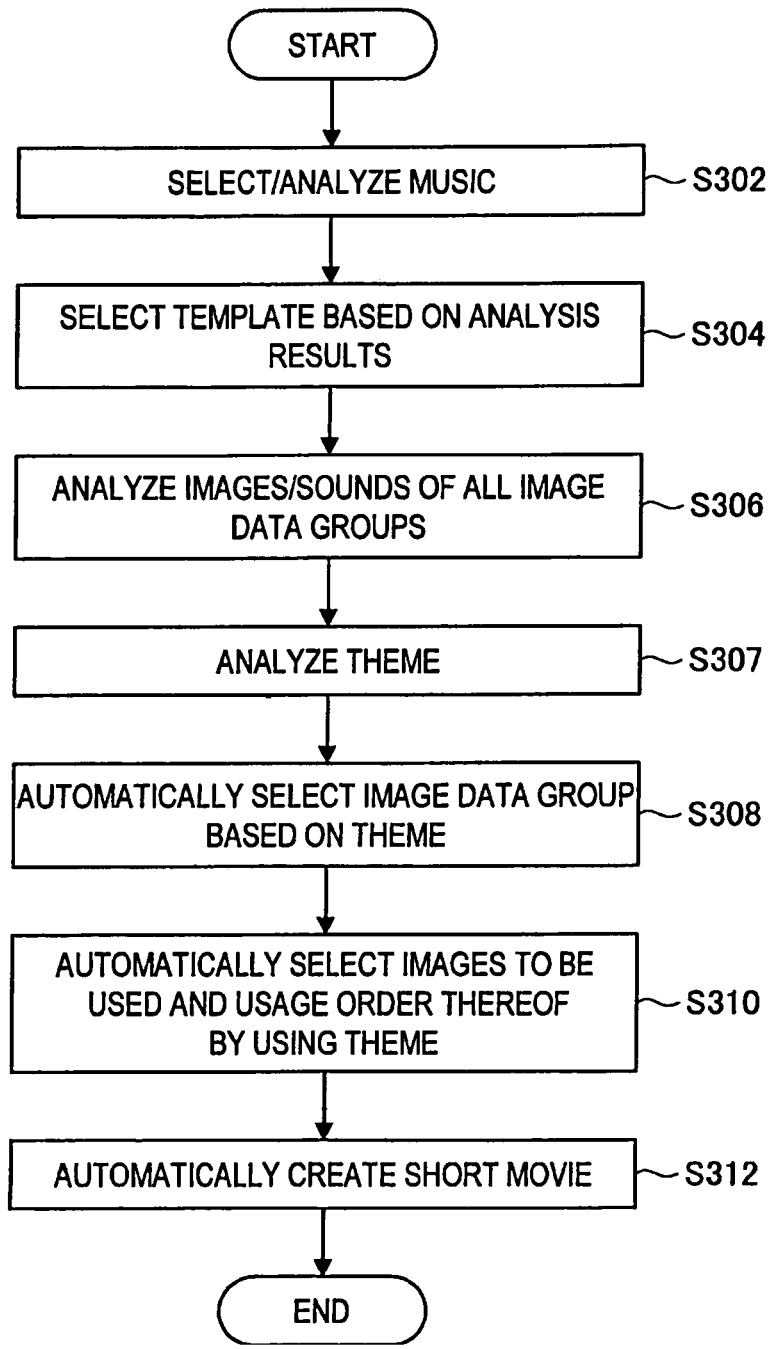
FIG. 15 is a flowchart showing an operation example in which the creation of the short movie starts from selecting music.

Next, FIG. 15 is an explanatory diagram showing short movie-creation operation in the information processing apparatus 100 in the case where a user selects and inputs music.

First, when the user selects music, the control section 140 causes the music selection section 126 to select the music specified by input information and causes the music analysis section 116 to analyze the selected music (S302). After that, the control section 140 causes the template selection section 122 to select a template based on the analysis results of the music in Step S302 (S304). Here, as a method of selecting a template based on the analysis results of the music, there can be exemplified: in the case where a "birthday" tag is attached to the music, a method involving selecting a template related to "birthday"; and a method involving analyzing the theme of the music, which is performed by the theme analysis section 118, based on the results of the analysis performed by the music analysis section 116, and selecting a template having most similar theme to the theme of the music.

Then, the control section 140 causes the analysis section 110 to execute image/sound analyses with respect to all image and video groups (S306), and further causes the analysis section 110 to analyze themes of image data groups based on the analysis results (S307). Then, the control section 140 causes the image selection section 124 to select an image data group to be used for creating a short movie based on the theme of the template selected in Step S304 (S308).

Then, the control section 140 causes the short movie-creation processing section 134 to select pieces of image data to be actually used for creating the short movie from among the image data group selected in Step S308 and to decide an order of using the pieces of image data (S310). All the pieces of image data in the image data group selected in Step S308 may be used for creating the short movie, or pieces of image data to be adopted for the short movie may be further selected from among the image data group. Further, the control section 140 causes the short movie-creation processing section 134 to execute short movie-creation processing (S312).

Figure 16:
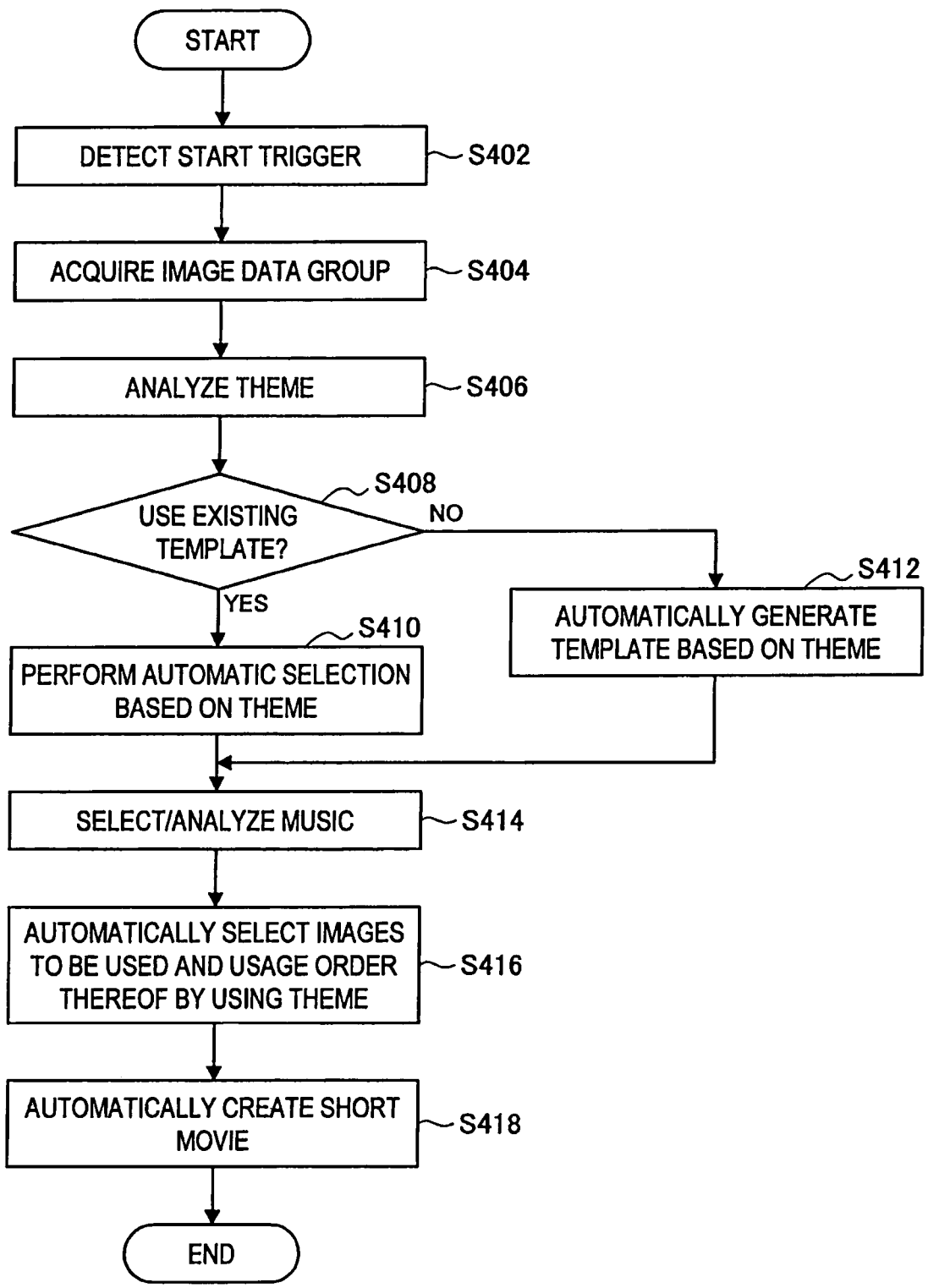
FIG. 16 is a flowchart showing an example of automation of operation.
Figure 17:
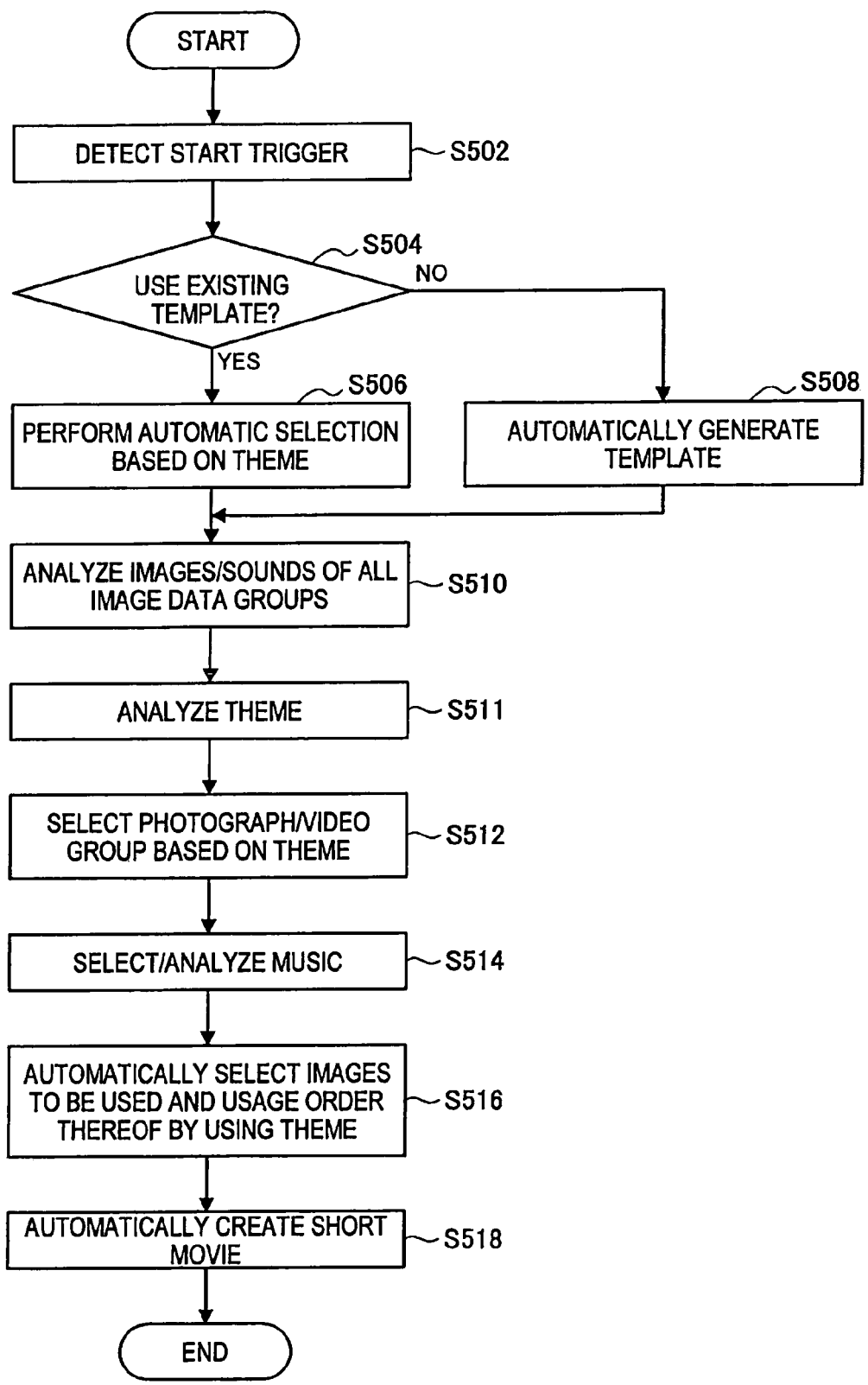
FIG. 17 is a flowchart showing another example of the automation of operation.

As described above, in the operation examples 1 to 3 described by using FIGS. 13 to 15, the creation of the short movie is started, triggered by the operation of the user. For example, in the operation example 1, an image data group is selected by the user to begin with, in the operation example 2, a template is selected by the user to begin with, and in the operation example 3, music is selected by the user to begin with. In those cases, when only one step of selection operation which is to be a trigger for starting short movie creation is performed by the user, the other processing is executed automatically. However, the information processing apparatus 100 according to an embodiment of the present invention is also capable of realizing short movie-creation processing in which selection operation by the user is not necessary. With reference to FIGS. 16 and 17, operation examples of short movie-creation processing in which operation by the user is unnecessary will be described.

[2-4. Automation of Operation (Operation Example 4)]

First, among operation examples of short movie-creation processing in which operation by the user is unnecessary, FIG. 16 is an explanatory diagram illustrating an example in which an image data group is selected first, based on a start trigger.

First, the control section 140 detects a start trigger, thereby starting short movie-creation processing (S402). The start trigger is some kind of an event detected within the information processing apparatus 100. For example, the start trigger may be the advent of the birthday of a registered user. Alternatively, the start trigger may be detection that today's weather (or tomorrow's weather) is snowy according to weather information on the Internet. Hereinafter, the case of detecting that the tomorrow's weather is snowy will be described.

When detecting the start trigger, the control section 140 causes the image selection section 124 to select an image data group (S404). Here, the image selection section 124 automatically selects image data determined to be a snow scene as a result of scene identification based on analysis results stored in the analysis result-storage section 106. Then, the control section 140 regards multiple pieces of image data acquired in Step S404 as an image data group and causes the analysis section 110 to analyze a theme (S406).

After that, whether or not to use an existing template for creating a short movie is determined (S408). Here, whether or not to use an existing template is determined by referring, by the control section 140, to a set value in an environmental setting.

In the case where it is determined in Step S408 that an existing template is to be used, a template is selected based on the theme of the image data group obtained as a result of the analysis in Step S406 (S410), the theme being a theme of templates stored beforehand in the template storage section 108. On the other hand, in the case where it is determined in Step S408 that an existing template is not to be used, the control section 140 causes the template generation section 132 to automatically generate a template based on the theme of the image data group obtained as a result of the analysis in Step S406 (S412).

After that, the control section 140 causes the music selection section 126 to select music to be used for creating the short movie (S414), and causes the short movie-creation processing section 134 to execute the selection of images based on the theme and decision of an order of using the images (S416), and to execute short movie-creation (S418). The processing of Step S414 to Step S418 is the same as the processing of Step S208 to Step S212, and hence, a detailed description will be omitted.

[2-5. Automation of Operation (Operation Example 5)]

Next, another example of the short movie-creation operation in which operation by the user is unnecessary will be described by using FIG. 17. FIG. 17 is an explanatory diagram illustrating an example in which a template is selected first, based on a start trigger.

First, the control section 140 detects a start trigger, thereby starting short movie-creation processing (S502). The start trigger is some kind of an event detected within the information processing apparatus 100. Here, the case where the start trigger is, for example, the advent of the birthday of a registered user will be described.

First, the control section 140 detects a start trigger, thereby starting short movie-creation processing (S502). When detecting the start trigger, the control section 140 refers to a set value in an environmental setting, thereby determining whether or not to use an existing template (S504). In the case where it is determined in Step S504 that an existing template is to be used, the control section 140 causes the template selection section 122 to select a template to be used (S506). At that time, the template selection section 122 selects, for example, because the start trigger is the advent of the birthday, a template having a keyword related to "birthday".

On the other hand, in the case where it is determined in Step S504 that an existing template is not to be used, the control section 140 causes the template generation section 132 to automatically generate a template (S508). At that time, the template generation section 132 generates the template based on the keyword of "birthday", for example.

When the template to be used is decided as described above, the control section 140 then causes the analysis section 110 to execute image/sound analysis of all image data groups (S510), and, based on the analysis results, further causes the analysis section 110 to analyze a theme (S511). Then, based on the theme which is the analysis result performed by the analysis section 110, the control section 140 causes the image selection section 124 to select an image data group (S512).

After that, the control section 140 causes the music selection section 126 to select music to be used for creating the short movie (S514), and causes the short movie-creation processing section 134 to execute the selection of images based on the theme and decision of an order of using the images (S516), and to execute short movie-creation (S518). The processing of Step S514 to Step S518 is the same as the processing of Step S208 to Step S212, and hence, a detailed description will be omitted.

<3. Examples of Effects>

As described above, by evaluating an image data group and a template to be used for creating a short movie based on the theme represented by the feature amount on the same feature axes, the information processing apparatus 100 according to the present embodiment can automatically select a combination of an image data group and a template based on the theme. At that time, by using indices which are easy to be sensuously understood by the user as the feature axes, it becomes possible to provide a template selection screen related to the feelings as shown in FIG. 12.

At that time, by capturing images as a feature of a "group", it becomes possible to more accurately grasp the whole, regardless of minute features of respective images. For example, in the past, although there was technology of grasping information of who was photographed in each image or where the photograph was taken, the images were not grasped as an "image data group" brought together as one event. For example, in the case where the user creates a short movie, it is most likely that the user wants to create the short movie by using pieces of data per event such as "school trip", "birthday", "wedding", "year 2010", or the like. In this case, it is necessary to capture a feature as an image data group which is brought together as one event, and the present invention is preferable. The information processing apparatus 100 can capture an atmosphere per event, and can select an appropriate combination of an image data group and a template.

Note that the functions of respective sections of the information processing apparatus 100 described in the above embodiment are actually achieved by the following procedures: an arithmetic unit such as a CPU (Central Processing Unit) (not shown) reads out, from a storage medium such as a ROM (Read Only Memory) or a RAM (Random Access Memory) which stores a control program in which procedures for realizing the functions are written, the control program, and interprets and executes the program. For example, in the information processing apparatus 100 according to the embodiment, the respective functions of the analysis section 110, the selection section 120, the template generation section 132, the short movie-creation processing section 134, and the control section 140 are actually achieved by executing, by the CPU, the program in which procedures for realizing the functions are written.

It should be understood by those skilled in the art that various modifications, combinations, sub-combinations and alterations may occur depending on design requirements and other factors insofar as they are within the scope of the appended claims or the equivalents thereof.

For example, in the embodiment described above, although the image analysis, the theme analysis, and the short movie-creation are performed within one information processing apparatus, the present invention is not limited to such an example. For example, the analysis may be performed on a server, and a user terminal may acquire the analysis results and may create a short movie. Alternatively, the analysis of a theme and the selection of a combination of a template and an image data group based on the theme may be executed on the server which has acquired results of the image analysis, the sound analysis, and the like, and the processing results may be output.

Note that the information processing apparatus 100 may be an information processing apparatus such as a PC (Personal Computer), video processing apparatus for home use (such as a DVD recorder and a video cassette recorder), a game device for home use, a consumer electronics device (such as a digital camera, a video camera, a TV, and a photo frame), and a car navigation device. Alternatively, the information processing apparatus 100 may be a portable information processing apparatus such as a portable phone, a PHS (Personal Handyphone System), a PDA (Personal Digital Assistants), a portable music reproduction device, a portable video processing device, and a portable game device.

Further, in the embodiment described above, although the image information is reflected on the theme by being evaluated based on the correspondence table as shown in FIG. 10, the present invention is not limited to such an example. For example, the theme may be evaluated based on image information by machine learning.

Note that, in the embodiment described above, the step of executing the analysis of the image data is not necessarily performed at the time of creating the short movie. The analysis processing may be omitted in the case where the analysis results of the materials stored beforehand in a storage section such as the photograph/video material-storage section 102 are stored in the analysis result-storage section 106.

Note that in the present specification, the steps written in the flowchart may of course be processed in chronological order in accordance with the stated order, but may not necessarily be processed in the chronological order, and may be processed individually or in a parallel manner. It is needless to say that, in the case of the steps processed in the chronological order, the order of the steps may be changed appropriately according to circumstances.

What is claimed is:

1. An information processing apparatus comprising:
an analysis section which analyzes, based on image information extracted from image data, a theme per image data group including a plurality of pieces of the image data;
a selection section which selects a combination of predetermined processing which is stored in association with the theme and the image data group based on the theme; and
a template selection section which selects a template based on the theme or input information by a user,
wherein the theme is shown in a feature amount space based on a plurality of feature axes each representing a predetermined evaluation criterion, and
wherein the selection section selects the combination based on a distance between a feature point of the image data group and a feature point of the theme associated with the predetermined processing.

2. The information processing apparatus according to claim 1,
wherein the analysis section calculates a feature amount based on a ratio of image data in which the image information has a predetermined feature out of pieces of image data included in an image data group.

3. The information processing apparatus according to claim 1, further comprising
a control section which acquires, from a plurality of image data groups, an image data group to be subjected to the predetermined processing, and which controls the analysis section to analyze a theme of the acquired image data group,
wherein the selection section selects, from among pieces of predetermined processing which are each stored in association with the theme, the predetermined processing based on the theme of the acquired image data group.

4. The information processing apparatus according to claim 3, further comprising
a control section which shows a position in the feature amount space of a feature point of the theme associated with the predetermined processing and a position in the feature amount space of a feature point of the theme of the image data group, and which causes a screen for selecting the predetermined processing to be displayed.

5. The information processing apparatus according to claim 1,
wherein the predetermined processing is processing for creating a short movie from the image data group.

6. The information processing apparatus according to claim 1,
wherein the image data group includes a plurality of pieces of image data which are brought together beforehand as a series of events based on a predetermined criterion.

7. The information processing apparatus according to claim 1, wherein the template comprises a variety of genres which have different feature amount.

8. The information processing apparatus according to claim 1, wherein the template comprises different dramatizing methods for a short movie.

9. The information processing apparatus according to claim 1, wherein said analysis section has a subject information analysis section which is configured to classify the image data into first images which include a human or humans and/or items and second images which include a scene or scenes.

10. An information processing apparatus comprising:
an analysis section which analyzes, based on image information extracted from image data, a theme per image data group including a plurality of pieces of the image data;
a selection section which selects the image data group based on a theme of a selected predetermined processing; and a template selection section which selects a template based on input information by a user, wherein the theme is shown in a feature amount space based on a plurality of feature axes each representing a predetermined evaluation criterion, and wherein the selection section selects the combination based on a distance between a feature point of the image data group and a feature point of the theme associated with the predetermined processing.

11. An information processing method for use with an information processing apparatus for causing the information processing apparatus to execute predetermined processing, the predetermined processing comprising the steps of:

analyzing, based on image information extracted from image data, a theme per image data group including a plurality of pieces of the image data;

selecting a combination of predetermined processing which is stored in association with the theme and the image data group based on the theme; and selecting a template based on the theme or input information by a user, in which the analyzing step, the selecting a combination step and the selecting a template step are performed by an arithmetic unit, wherein the theme is shown in a feature amount space based on a plurality of feature axes each representing a predetermined evaluation criterion, and wherein the selection section selects the combination based on a distance between a feature point of the image data group and a feature point of the theme associated with the predetermined processing.

12. A non-transitory computer readable storage medium having stored thereon a program for causing a computer to function as:

an analysis section which analyzes, based on image information extracted from image data, a theme per image data group including a plurality of pieces of the image data, a selection section which selects a combination of predetermined processing which is stored in association with the theme and the image data group based on the theme; and a template selection section which selects a template based on the theme or input information by a user, wherein the theme is shown in a feature amount space based on a plurality of feature axes each representing a predetermined evaluation criterion, and wherein the selection section selects the combination based on a distance between a feature point of the image data group and a feature point of the theme associated with the predetermined processing.

* * * * *